United States Patent [19]

Gennery et al.

[11] Patent Number: 4,790,026

[45] Date of Patent: Dec. 6, 1988

[54] PROGRAMMABLE PIPELINED IMAGE PROCESSOR

[75] Inventors: Donald B. Gennery, Glendale; Brian Wilcox, Tujunga, both of Calif.

[73] Assignee: The United States of America as represented by the Administrator of the National Aeronautics and Space Administration, Washington, D.C.

[21] Appl. No.: 815,103

[22] Filed: Dec. 31, 1985

[51] Int. Cl.$^4$ .............................................. G06K 9/54
[52] U.S. Cl. ...................................... 382/49; 382/41; 382/42; 364/131
[58] Field of Search .............................. 361/393–395; 364/704, 723, 724, 728, 131, 133; 382/41, 42, 49, 50, 54, 55, 56

[56] References Cited

U.S. PATENT DOCUMENTS

| | | | |
|---|---|---|---|
| 4,369,430 | 1/1983 | Sternberg | 340/146.3 |
| 4,439,840 | 3/1984 | Coleman et al. | 364/900 |
| 4,464,789 | 8/1984 | Sternberg | 382/48 |
| 4,466,064 | 8/1984 | Martin | 364/200 |
| 4,479,036 | 10/1984 | Yamamoto et al. | 364/728 |
| 4,484,346 | 11/1984 | Sternberg et al. | 382/27 |
| 4,484,349 | 11/1984 | McCubbrey | 382/49 |
| 4,498,134 | 2/1985 | Hansen et al. | 364/200 |

OTHER PUBLICATIONS

Etchells, D., "A Study of Parallel Architectures for Image Understanding Algorithms", *ISG Report*, pp. 133–176, USC, 10/19/83.

Reeves, A. P., "Parallel Computer Architectures for Image Processing", *Comp. Vis., Gra., and Img. Proc.*, 25, 1984, pp. 68–88.

Strong, J., "NASA End to End Data System, Massively Parallel Processor", *Goddard Space Flight Center Report*, 5/30/80.

*Primary Examiner*—Leo H. Boudreau
*Assistant Examiner*—Jose L. Couso
*Attorney, Agent, or Firm*—Thomas H. Jones; John R. Manning; Paul F. McCaul

[57] ABSTRACT

A pipelined image processor selectively interconnects modules in a column of a two-dimensional array to modules of the next column of the array of modules 1,1 through M,N, where M is the number of modules in one dimension and N is the number of modules in the other direction. Each module includes two input selectors (10,11) for A and B inputs, two convolvers (12,13), a binary function operator (15), a neighborhood comparison operator (14) which produces an A output and an output selector (16) which may select as a B output the output of any one of the components in the module, including the A output of the neighborhood comparison operator. Each module may be connected to as many as eight modules in the next column, preferably with the majority always in a different row that is up (or down) in the array for a generally spiral data path around the torus thus formed. The binary function operator (15) is implemented as a look-up table (20) addressed by the most significant 8 bits of each 12-bit argument. The table output includes a function value and the slopes for interpolation of the two arguments by multiplying the 4 least significant bits in multipliers (21) and (22) and adding the products to the function value through adders (23) and (24).

5 Claims, 5 Drawing Sheets

FIG. 1

*INCLUDES APPROPRIATE DELAYS

PROGRAMMABLE PIPELINED IMAGE PROCESSOR

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

This invention relates to a video image processor, and more particularly to a programmable pipelined image processor for feature extraction (PIFEX).

Computerized vision systems require an enormous amount of data processing. This seems to be especially true for the low-level tasks in which the data are still in the form of an image. Often thousands of fundamental operations must be performed for each pixel (picture element), and typically there are around a hundred thousand pixels per image frame. Real time processing at a rate of 30 or 60 images per second therefore may require a processing speed of around $10^{10}$ operations per second. Conventional computer architectures (of the Von Neumann type) are not currently capable of approaching these speeds. The fastest Von Neumann computers are two or more orders of magnitude too slow for typical problems in real-time computer vision. There is therefore a need for a real-time image processor capable of feature extraction and other low-level vision analysis.

The solution to this large data processing need is generally thought to be some form of parallel processing, so that a large number of computational elements operating simultaneously can achieve the necessary rates. (For reviews of parallel processors see D. Etchells, "A Study of Parallel Architectures for Image Understanding Algorithms," in ISG Report 104 (R. Nevatia, Editor), pp. 133–176, University of Southern California, Oct. 19, 1983, and A. P. Reeves, "Parallel Computer Architectures for Image Processing," Computer Vision, Graphics, and Image Processing 25 (1984), pp. 68–88.) There are several ways in which the necessary parallelism can be achieved.

One way is to use a multiple-instruction stream multiple-data-stream (MIMD) system, which consists of many Von Neumann machines operating on different parts of the same problem and communicating their results to each other. Such a multiprocessor system may be appropriate for the high-level portion of powerful future vision programs. However, for the low-level portions of the vision task, such a system is not cost-effective. This is because low-level vision tasks contain computations that are performed almost identically over the entire image, and it is wasteful to use the full power of general-purpose processors to do these repetitive tasks.

Another type of parallel computer is the single-instruction stream multiple-data-stream (SIMD) system. In such a system arithmetic units for each portion of the image frame (perhaps each pixel) perform the same operations simultaneously under the control of a master processor. If there is an arithmetic unit for each pixel, such a system is fairly convenient to use and is very fast. However, the cost is high. For example, a parallel processor described by J. Strong, "NASA End to End Data System, Massively Parallel Processor," Goddard Space Flight Center, May 30, 1980, was built for NASA by Goodyear Aerospace and is possibly the most powerful computer of this type so far. It contains 16,384 arithmetic units, which occupy 2048 chips, and costs several million dollars. It is arranged as a 128-by-128 array, and can add the elements of one 12-bit array to those of another 12-bit array in 3.7 microseconds, which corresponds to $4.4 \times 10^9$ operations per second.

Another approach is a pipelined-image processor, which processes the pixels sequentially as they are scanned usually, but not necessarily, at the normal video rate. The parallelism can then be built into the device so that it performs more than one arithmetic operation for each pixel. Some of these operations can be done simultaneously on corresponding pixels in parallel data paths, and some can be done in a pipelined fashion in which one operation is being done on one pixel while the next operation is being done on the previous pixel, which already has had the first operation performed on it. Also no time is spent decoding instructions while this processing is going on, because the same operations are performed over and over, at least for one frame interval, and no access time for the data is needed.

This pipelined type of system can be far less expensive than an SIMD system, because it requires a number of processing elements depending on the number of steps in the algorithm instead of depending on the size of the image, and the former is usually a few orders of magnitude less than the latter. It usually is not as fast as an SIMD system, but it can process an entire image in one frame interval (normally 1/30 second or 1/60 second), and is thus suitable for real-time applications. If the number of steps in the algorithm exceeds the number of processing elements, separate passes can be made to complete the algorithm. This requires extra frame intervals and perhaps additional time for reprogramming the device.

Pipelined-image processors have been built in the past. However, they are very restricted in the kind of computations that they can do. They do not include the full range of desired computations, and what they do include often is not fully programmable. Furthermore, their computational power falls short of what is needed for many tasks. What is desired is a programmable system that will perform elaborate computations whose exact nature is not fixed in the hardware and that can handle multiple images in parallel.

The main problems in designing such a programmable pipelined system are in choosing a set of fundamental operations that are sufficiently general and that can be implemented in the desired quantity at a reasonable cost, and finding a practical way of interconnecting these operators that allows sufficiently general programability.

SUMMARY OF THE INVENTION

In accordance with this invention, image-pipelining processing of the data is accomplished using an array of identical programmable computing modules interconnected in a two-dimensional toroidal arrangement; the computing elements employing convolvers, neighborhood comparison operators, binary function operators using look-up tables with interpolation, input selectors, and output selectors. The input and output selectors are used for selectively cascading computing elements from column to column in the array, selecting up to two of a plurality of rows for the input data so that data may be selectively routed through paths in the array involving different computing elements programmed to perform different operations. Although all of the computing elements in the arrays are identical, they may operate differently because of programming in the input selectors, the two convolvers that receive separate data inputs, a binary function operator that receives as many as two arguments of the binary function to be performed by the table look-up operator, a neighborhood comparison operator receiving its input from the binary function operator, and a selector which may select as the output of the computing element the output of any one of the included components, with appropriate delays. The binary function generator is implemented with limited memory capacity, and is therefore limited to fewer addressing bits than present in the convolver outputs. Therefore only the most significant bits are used to address the memory, and the less significant bits are used to interpolate the output of the look-up table. Each output includes the slopes of the function stored in the table for the two arguments (independent variables), and the least significant bits of the two arguments are multiplied by the respective slopes, and the products are added to function value read from the table.

The novel features that are considered characteristic of this invention are set forth with particularly in the appended claims. The invention will best be understood from the following description when read in connection with the accompanying drawings.

DESCRIPTION OF PREFERRED EMBODIMENTS

Figure 1:
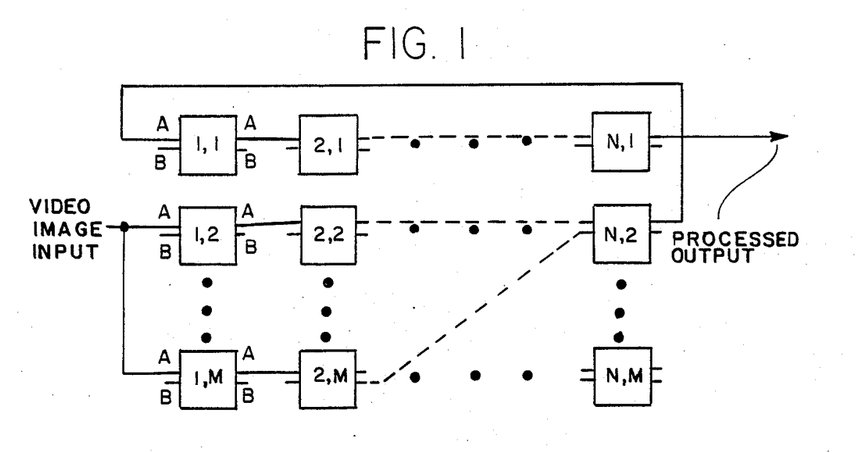
FIG. 1 illustrates a pipelined image processor in accordance with the present embodiment utilizing an array of identical modules configured as shown in FIG. 2.

In accordance with the concept of the invention in its broadest aspects, a pipelined image processor shown in FIG. 1 is provided with an array of programmable modules for functions that may be applied to neighbor pixels of each pixel on each pass through the processor. The new value of each pixel is determined by a process carried out by modules selectively connected in cascade under program control of a host computer (not shown). Successive ones of selected modules 1,1 through N,M (where the first digit of a pair of digits used to identify a module signifies a column number and the second digit signifies a row number in the matrix of NM modules) perform successive iterations in one pass. Central to the concept is the use of programmable modules in a two-dimensional array. For greatest flexibility in programming the system, all modules are alike.

Thus the pipelined image processor is comprised of a plurality of modules interconnected in two-dimensional toroidal form, i.e., interconnected from module to module in the horizontal dimension (as viewed in FIG. 1) back to the input, and interconnected from a module in a given row and column of the array to a module in another row of the next column for the second toroidal dimension. The modules are implemented as shown in FIG. 2.

Figure 2:
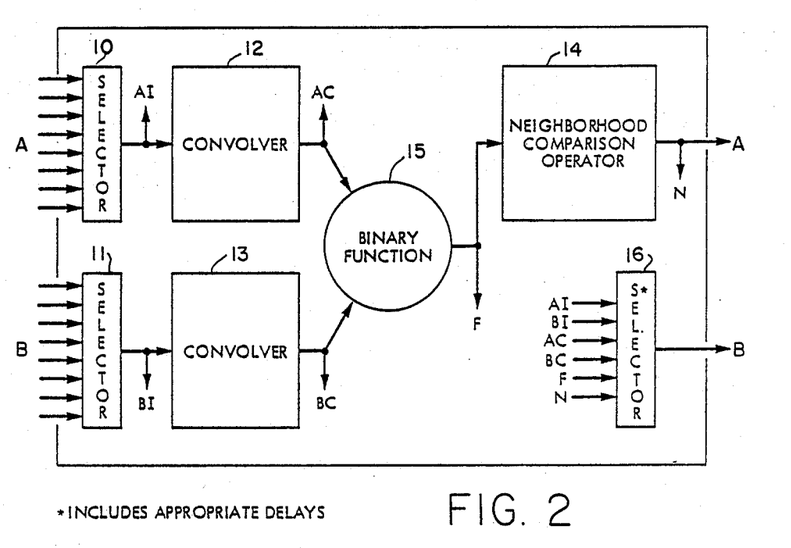
FIG. 2 is a block diagram of each module in FIG. 1.
Figure 3:
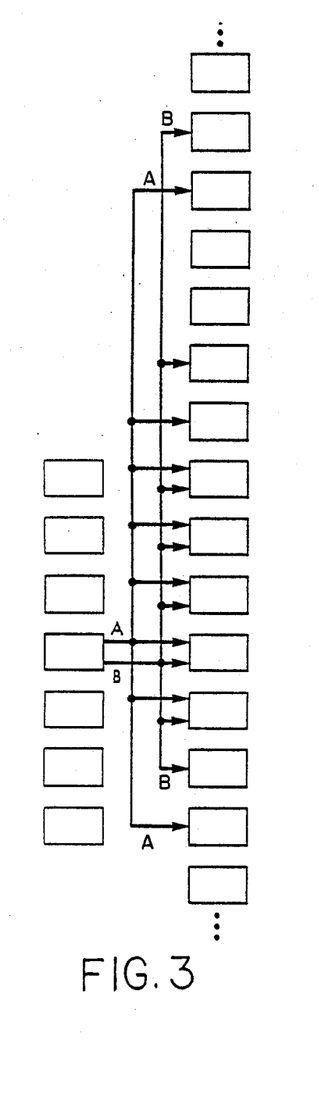
FIG. 3 illustrates a preferred embodiment for each module (having two 12-bit outputs A and B) fanned out to modules of the next column in the array.

Each module has two input selectors 10, 11, two convolvers 12, 13, a nonlinear neighborhood comparison operator 14, a binary function generator 15 implemented as an interpolated look-up table coupling the convolvers 12, 13 to the neighborhood comparison operator 14, and an output selector 16 to select, as an alternative to the output A of the neighborhood comparison operator, a second output B which may be the output of any component in the module, including the neighborhood comparison operator, as shown in FIG. 2. Thus, each module includes: two outputs, a first output A from the neighborhood comparison operator, and a second output B from a selector which may be programmed to select the output of any component within the module, including two input selectors, a first input selector 10 for selecting as an input A the output A of any one of eight modules, and the second input selector for selecting as an input B the output B any one of several modules, as illustrated in FIG. 3. Each module of a column in the array may thus feed a number of modules in the next column.

For convenience in implementing the selectors using standard logic gates, and to constrain the number of electrical contacts on each module, the fan out capability is limited to eight, i.e., each module may feed eight modules in the next column as shown in FIG. 3. The direction of main data flow is thus from left to right in FIG. 1 and back through the left column from the right column in a toroidal configuration as shown by the solid arrows for the two topologically equivalent forms illustrated in FIG. 4, where the dotted line shown represents input-output switches. Note that the flow of data is always advanced from one column to the next in the same or different row(s), but in general more to an upper (or lower) row to effectively define a helical path around the torus. Although such is not necessary conceptually, it is advanced in this way (column to column) in order to aid in fitting an algorithm into the available modules as it wraps around the torus, i.e., for convenience in programming.

The system, shown in FIG. 1 receives one or more video images as they are scanned, already in digital form, from external image buffers (not shown) or through A/D converters from TV cameras (not shown), and processes them in one or more modules. It performs pipelined operations on them as specified by a host computer (not shown) which presets the modules and feeds the results back into the image buffers. In principle, the operations include convolving with various specified functions; arithmetic functions such as addition, subtraction, multiplication, division, square root, maxima, and minima; unary table look-ups to map pixel values to new values; and nonlinear neighborhood operations to do such things as finding local maxima, minima, zero-crossings, directional maxima and minima, thinning, and growing. The delays caused by the processing are taken into account upon reloading the buffers. If sufficient processing cannot be done in one pass, the results stored in a buffer from a previous pass can be used again, but it is expected that most desired computations can be done in one pass (one frame interval plus additional pipeline delays) through the array of modules.

Although it would be desirable for some applications to have the ability to convolve the images with fairly large functions, it is impractical at present to fit such a convolver on one VLSI chip. Therefore, the present invention employs only 3-by-3 convolvers (all identical, but with individually programmable weights), as disclosed in a copending application Ser. No. 06/815,106 titled CONVOLVER filed concurrently. However, using several of these in various series and parallel combinations can produce the effect of using larger convolvers. This is practical because of the fact that the desired functions usually are one of two types: small functions (3-by-3) used for such purposes as differentiation, and large functions used for smoothing. The best smoothing function normally is some approximation to the Gaussian function, and the Gaussian function has the advantages that it can be factored into one-dimensional functions and that it can be approximated by convolving several small functions in series. Either fact (especially the latter) allows a good approximation to the two-dimensional Gaussian function of moderate size to be produced by using a plurality of 3-by-3 convolvers in cascade. Any one-dimensional function can be produced easily from these small convolvers. (Although any two-dimensional function can be produced in principle, it is impractical for large functions that do not have special properties such as the Gaussian function.) It should be noted that the precision of digitized images usually is only 8 bits, but that more precision can be created by smoothing. For this reason and because of the increase in dynamic range produced by some computations, 12 bits are used in the input and output of the convolvers (as described in detail in the aforesaid copending patent application).

One approach to the arithmetic functions is to have separate hardware adders, multipliers, etc. Another approach is to use a table look-up which can be programmed for any particular function desired. Each of these approaches has its advantages. The advantages of the separate hardware functions are that they require less circuitry and that they can be reprogrammed quickly by changing the switches that connect them. Several of the functions could fit on one VLSI chip, whereas one look-up table requires many chips (far too many if high precision is needed). The advantages of the look-up table are its uniformity, its greater ease of design (it uses standard memory chips, which are becoming quite cheap), and the fact that any possible function can be programmed into it, whereas with the other approach any function not included in the design (such as trigonometric functions, for example) would have to be approximated by using a considerable number of simpler functions. Another advantage is that the unary (single argument) look-up table is not needed, since its purpose is subsumed by the binary (two argument) look-up table. The precision needed in the final results of these functions for typical images is about 8 bits. Because of the greater dynamic range produced by such operations as multiplying, intermediate results need greater precision (preferably 16 bits) since only fixed-point computations are practical. However, the table look-up approach allows a compression of the dynamic range with such operations (perhaps by using the square root or logarithm), so that 12 bits are adequate. A direct binary 12-bit table look-up is impractical, but doing a binary 8-bit look-up with linear interpolation for the low-order 4 bits is reasonable, as described in detail hereinafter with reference to FIG. 7.

The nonlinear neighborhood operations are performed by a neighborhood comparison operator described in more detail in a copending application Ser. No. 06/815,099 titled NEIGHBORHOOD COMPARISON OPERATOR filed concurrently, which compares the nine pixels in the neighborhood to a fixed threshold or (for the surrounding eight pixels) to the center pixel to produce nine bits of information. Two more bits are appended to indicate the odd-even pixel/line position of each central pixel in a 3×3 window. A function of these eleven bits is then used to determine whether the 12-bit output of the operator is to be (1) the center pixel, (2) the bit-wise logical OR of the surrounding eight pixels, or (3) a function of these eleven bits of information. By suitably programming the operator, a variety of operations (some of which are mentioned above) can be performed.

THE MODULE

The economic advantages of having many identical units connected in a regular way outweights (in the near term, at least) the inefficient use of extra hardware on each unit. Thus, it is desirable to have general, programmable elements of each basic type (convolvers, binary functions, and neighborhood comparison operators) on each module. Since the binary function needs two data paths, the smallest module would have two inputs feeding a binary function, which in turn feeds a convolver and then a neighborhood operator. However, examination of simple algorithms (e.g., edge detection) suggests that two convolvers (one on each input) ahead of the binary function is much more useful than having a convolver after the function. This is especially true since the convolvers are relatively inexpensive compared to the amount of memory needed for the large look-up table used in the current approach to the binary functions, so that adding a convolver does not greatly increase the cost of the modular unit. The two inputs to the binary function via convolvers are denoted AC and BC in FIG. 2.

The interconnection of the modular units requires some flexibility in the routing from one stage of the pipeline to the next. If one visualizes columns of modular units, all synchronized, as being a stage of the pipeline, then a flexible interconnection scheme to the next column requires that the output of a module in some row be selectively routable to some other row in the next column. A connection to all possible rows need not be provided, only enough to allow a rich interconnection architecture for a wide variety of possible algorithms. Assuming that the modules are plugged into a passive backplane which provides only connecting wires (as is the common practice in both general-purpose and special purpose electronic equipment and computers), then some input selectors must be added to the modules. Since it was deduced above that each card should have two input channels (to the two convolvers), a different selector should choose which of several inputs should be fed to each of the two convolvers. Selectors built from standard logic circuits are available for 2, 4, 8 or 16 alternatives. Since a 12-bit data path has been chosen, the number of wires to be selected is 12 times 2 inputs times the number of alternative inputs to the selector. For 8 alternatives, this is 192 wires, which is a reasonable maximum for single input to a single circuit board. Furthermore, examination of possible algorithms indicates that a choice among 8 inputs provides sufficient flexibility to make efficient use of each module in the array. Note that the outputs of the two selectors 10 and 11 may be selected as the output B by the selector 16.

The outputs of the two convolvers 12, 13 are hardwired to the two inputs of the binary function 15, its output is hardwired to the input of the neighborhood comparison operator 14, and its output forms the output A of the module. (The convolvers and the neighborhood comparison operator include the line buffers needed to enable them to operate on 3-by-3 windows.) To allow a significant increase in programming flexibility at a minor cost in terms of increased hardware, an additional selector 16 provides the B output. This output selector 16 passes any one of the intermediate values produced in the module (inputs to the convolvers as selected by the input switches, the convolver outputs, the binary function output, or the neighborhood comparison operator output). The pipeline delay (including extra line buffers) is equalized on this output to match the A output which passes through delay in a convolver and delay in a neighborhood operator. (This is an important feature of the invention; there is automatic delay equalization as the signals propagate through the stages of the pipeline.)

All data paths between modules and between operators and functions within a module, consist of 12 bits each. In order to have one more bit of precision when negative numbers are not needed, each operator on each module can treat these quantities either as unsigned integers or as positive or negative two's-complement integers, as specified by the programming information. Since the binary functions are completely programmable, the representation in these integers is up to the programmer.

In cases where not all of the operations in a particular module are needed, it is, of course, possible to program any of them to be identity operations. For a convolver, this means using unity for the center weight and zero for the others, for the binary function it means having the contents of the table look-up be the same as one of its inputs (with unity slope for interpolation), and for the neighborhood comparison operator it means passing the center value in all cases.

The present system is capable of pipeline processing data at rates of up to 8,000,000 pixels per second (in each of the parallel paths through the module interconnection network). It will handle images with up to slightly more than 2000 pixels per line. (The latter limit is determined by the size of the line buffers. There is no limit on the number of lines in a frame.)

The system is programmed from a host computer (not shown) through a direct memory access (DMA) interface (also not shown). This will permit each binary function (which uses a quarter-megabyte look-up table) to be programmed in under 200 milliseconds. The binary functions on all system modules which are to be loaded with the same function can be programmed simultaneously in two 64K 16-bit DMA transfers. This is a great benefit, since a system array with several hundred modules would likely only have a dozen or two different binary functions, so that the programming time is a few seconds rather than many tens of seconds. The look-up table for each different neighborhood comparison operator is similarly programmed in a 2K DMA transfer. The convolver weights, input selection, and other miscellaneous data are programmed in an 80-word DMA burst for each module needing reprogramming.

MODULE INTERCONNECTION

The system modules are connected in a two-dimensional pattern chosen so that the switch selections inside the modules produce flexibility in programming. The outputs from the modules in each column in the pattern are connected to the inputs of modules in the next column, so that the main data flow is considered to be from left to right. In this way, synchronism is achieved, since all of the modules in a given column (except for the wrap-around of rows discussed below) are processing corresponding pixels at the same time. Different rows of modules correspond to parallel data paths, but these different paths can communicate with each other because of the branching of the connections from one column to the next.

In the branching patterns considered, the A outputs from modules in one column connect only to A inputs in the next column, and B outputs connect only to B inputs, as shown in FIG. 3. (Although this restriction is not necessary, it seems to be convenient.) A fanout of four has been tried, with the number of rows upwards from output to input being $-1, 0, 2, 7$ for A and $-5, 0, 1, 3$ for B. An alternate pattern considered was $-1, 0, 2, 6$ for A and $-2, 0, 1, 2$ for B. The former of these, at least, works fairly well for simple algorithms, but a fanout of only four is quite restrictive for more complicated algorithms. Therefore, a fanout of eight is preferred. That is, each A or B output branches to eight different inputs, and thus the A and B inputs on a module each receive eight signals, one of which is selected in the module, as described above. The fanout pattern chosen, at least initially, is $-3, -1, 0, 1, 2, 3, 4, 8$ for A and $-2, -1, 0, 1, 2, 3, 5, 9$ for B. This pattern is shown in FIG. 3. (It should be noted that the fanout pattern has more connections going to upper rows than lower rows. This helps to take advantage of the two-dimensional toroidal topology referred to hereinbefore and described in more detail below.)

Figure 4:
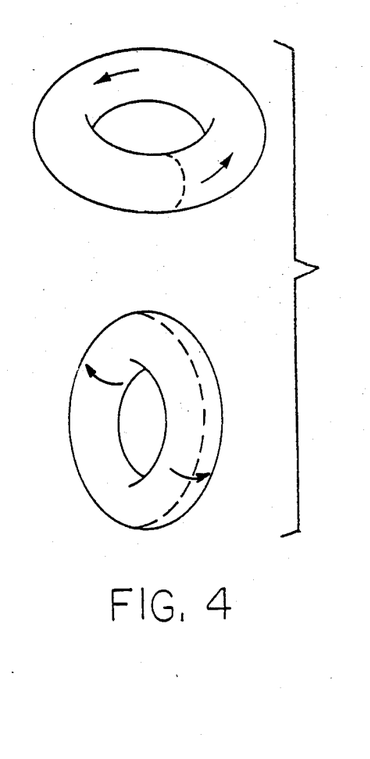
FIG. 4 illustrates the two-dimensional toroidal interconnection topology of the modules of an array.
Figure 6:
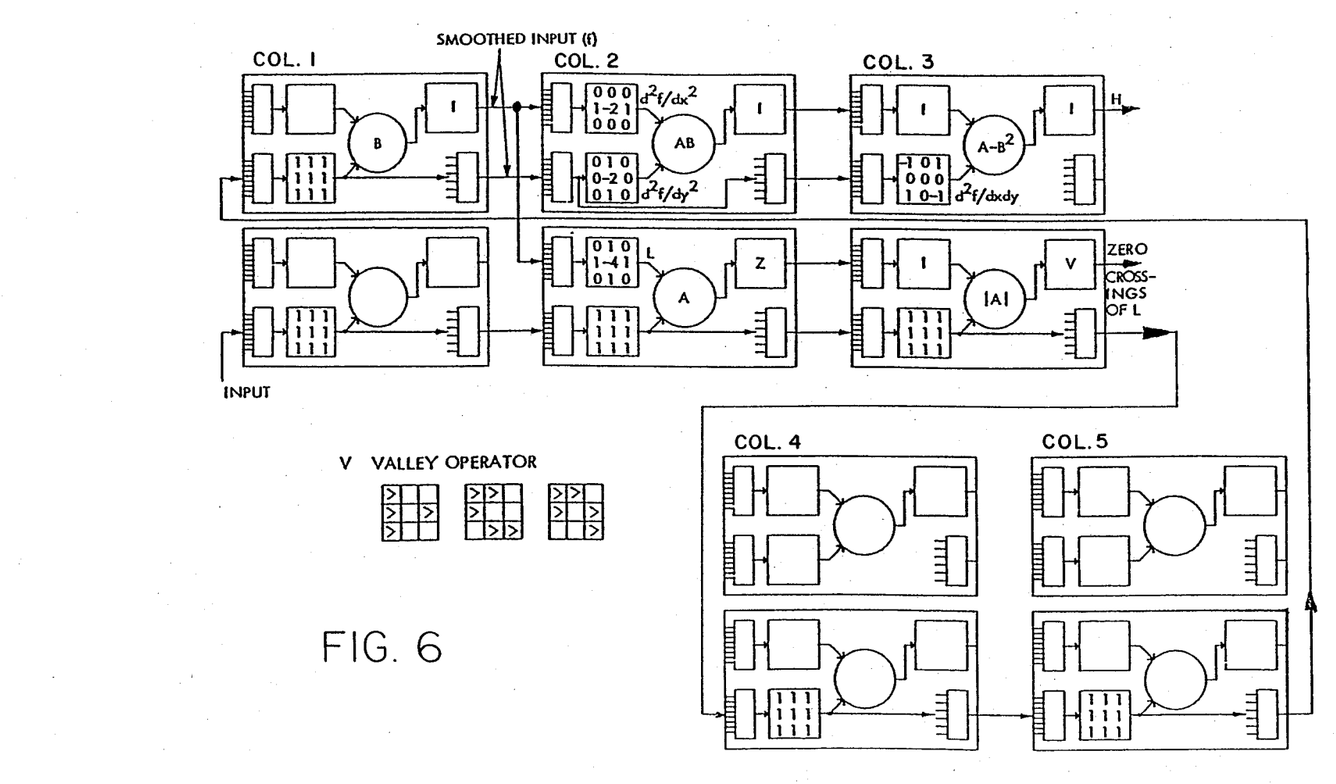
FIG. 6 illustrates an example of an array of modules used for computation of zero crossings of Laplacian (the trace of the determinant of the matrix of second derivatives) and the Hessian (the determinant of the matrix of second derivatives, sometimes called the Gaussian curvature).

Each column may be considered to wrap around a toroid of either form shown in FIG. 4 to form a loop, and the fanout pattern shown in FIG. 3 is cycled invariantly around the loops. This feature is convenient for algorithms that just barely fit, since crossing the boundary that otherwise would exist at the top and bottom may help in making the necessary connections. More importantly, each row also wraps around to form a loop in the direction of the main data flow along rows of modules. The fanout pattern continues cyclically around these loops also, except that after one particular column there are switches that can break each connection between the output of a module and the fanout to the next column, so that outputs can be extracted from the particular column and inputs can be inserted in the next column of the two-dimensional toroidal array. This row wrap-around feature is important for efficient coding of algorithms that vary greatly in the width and length of data paths that they require, since an algorithm that requires a long path can spiral around several times, using only as many parallel data paths at any point as it needs. The upward bias of the fanout helps in spiraling the paths in one direction in order to avoid collisions. A simple example of this is shown in FIG. 6. (Since, on different passes around, the pixels have been delayed by different amounts, ordinarily data from these different paths should not be combined with each other.)

The two wrap-around features combined cause the interconnections of the modules to have the topology of a torus as noted hereinbefore and shown in FIG. 4. In practice, there is a cut around the torus at one place (shown by dotted line) to allow inputs (from image buffers or TV cameras) and outputs (to image buffers) to be selectively connected, under control of the host computer.

A typical system has five columns and about 16 rows. Thus, it is possible to code algorithms that vary from requiring a data path 16 modules wide and 5 modules long to requiring a data path one module wide and 80 modules long, without having to use separate passes through the system on separate frame times.

OPERATIONAL EXAMPLES

In all of the examples shown in this section, details of the programming—such as the scale factors of quantities—are omitted for simplicity. For example, the weights in the convolvers are assumed to be integers and the shifts for scaling are omitted. In practice, appropriate shifts must be included to prevent fixed-point overflow and to prevent excessive loss of significance in the 12-bit data. (The figures in this section all illustrate the components in each module according to FIG. 2.)

Many low-level vision and image-processing algorithms can be performed. These include such things as filtering, detection of edges by various methods, detection of corners and vertices, bridging gaps in lines, shrinking lines, detection of the intersections of lines, comparison of different images to detect changes or motion, simple texture measurement, stereo area correlation, and estimation of surface color. Some of these, such as complicated vertex detectors or stereo correlation, would require many modules. However, for simplicity only a few algorithms that can be done in a small number of modules will be given as examples here.

Figure 5:
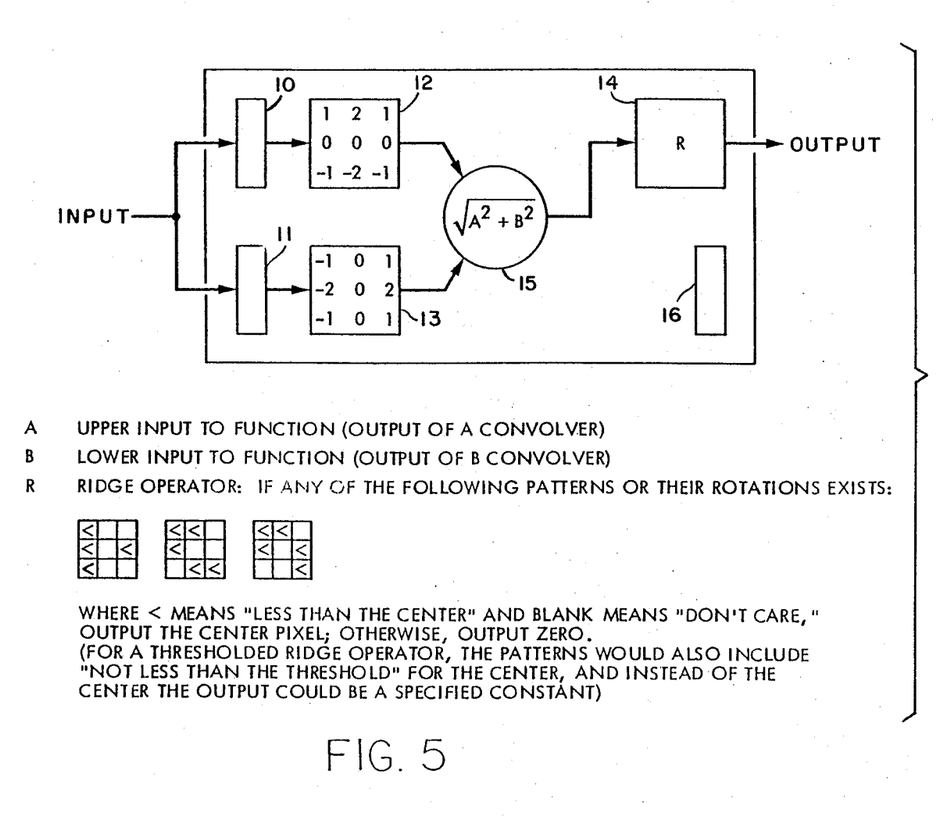
FIG. 5 illustrates one example of the use of a single module as a Sobel Operator with thinning.

The first example is the Sobel edge detector plus thinning, which requires only one module, as shown in FIG. 5. The two convolvers 12 and 13 compute the two components of the gradient (different weights are possible here, the ones shown are for the true Sobel operator), the binary function 15 then computes the magnitude of the gradient, and the neighborhood comparison operator 14 finds the ridges (one-dimensional maxima), so that the resulting nonzero values are only one pixel wide. If the direction of the edge also is wanted, another module in parallel with this one could be used, with the same convolver weights but with the double-argument arc-tangent as the binary function. Note that the same input is selected for the two convolvers, i.e., inputs A and B are made the same. This is done in a preceding module (not shown) where the output selector selects as the output B the output A.

The next example is the computation of the zero crossings of the Laplacian (the trace of the determinant of the matrix of second derivatives) often used in edge detection and stereo correlation and the Hessian (the determinant of the matrix of second derivatives, sometimes called the Gaussian curvature) often used in corner and vertex detection. These operators are ordinarily applied to smoothed data. FIG. 6 shows six iterations of convolving with the averaging function for smoothing, which results in a fairly good approximation to smoothing with a Gaussian function with a standard deviation of 2 pixels. The Laplacian (L) and the Hessian (H) of the result are then computed, and two neighborhood comparison operators and one arithmetic function are used to find the zero crossings of the Laplacian. Letters are used to represent the following:

I Identify operator
A Upper input to function (output of A convolver)
B Lower input to function (output of B convolver)
Z If at least one neighbor tests opposite to the center pixel on the <0 test, output is the center pixel; otherwise, output is the maximum possible positive value $(2^{11}-1)$
V Valley operator: If any of the patterns shown or their rotations exists: where > means "greater than center" and blank means "don't care," output is a constant; otherwise, output is zero (The first neighborhood comparison operator produces approximate zero-crossings; the other two steps force them to be only one pixel wide, by choosing the pixels closest to zero.)

Several variations are possible in this example. Better 3-by-3 approximations to the derivative operators are available than the simple ones shown here, and different smoothing operators could be used. Slightly more smoothing could be done without using more than two rows, since the extra two columns on the second time around could be used. Considerably heavier smoothing could be done by using more rows. If sufficient modules are not available, it is, of course, possible to perform some of the computations on one pass through the system, to save the results in an image buffer, and then to perform the remaining computations on a subsequent frame time. However, if substantial reprogramming of the system is needed to do this, considerably more time than one frame time may be needed. If the computations to be performed on subsequent passes are identical, as they would be in this example for the smoothing, no reprogramming is needed.

BINARY FUNCTION WITH LINER INTERPOLATION

The various binary and unary arithmetic functions indicated in the examples are carried out by a binary function implemented as a look-up table with linear interpolation, which will now be described with reference to FIG. 7. It is designed to handle 12-bit A and B inputs with a memory having a 16-bit address input for the two inputs.

The need for a 12-bit data path was discussed above. Given this, the design of the linear interpolation hardware is constrained by commercially available components. There is only one type of memory chip which offers the 120-nanosecond cycle times needed for real-time pipeline processing and the density which makes a single circuit card for the module feasible—the 64K CMOS static memory chip. These are organized as 8K by 8; thus blocks of memory using these chips must have an output which is a multiple of 8 bits. Since a 12-bit function value plus two slopes for interpolating both arguments must be looked up in this memory, one has a reasonable choice between a 24-bit-wide table (12 plus two 6-bit slopes), a 32-bit-wide table (12 plus two 10-bit slopes), or 40-bit-wide table (12 plus two 14-bit slopes). A reasonable compromise between the size of the table and the precision of the result for nonlinear functions calls for interpolating the least significant 4 bits of each argument, requiring a total of 16 bits to address the table. A 16-bit value can take on 64K possibilities, so the table must be organized as 64K by 24, 32, or 40. The choice between these three possibilities is determined by the maximum slope which one wants to allow for the stored function. To maintain 1-bit accuracy over the 4-bit interpolation range (16 values), the slope in the look-up table must be able to take on values as low as 1/16 (a change of one bit over the interpolation range). This means 4 bits to the right of the binary point. Thus, the remaining bits in the slope are to the left of the binary point and represent slopes greater than unity. One of these remaining bits must be reserved for the sign of the slope. A 6-bit slope will then have one significant bit to the left of the binary point, for a maximum slope of 2 (actually 1 15/16, all ones). A 10-bit slope can represent slopes as high as 32, and a 14-bit slope can represent values as high as 512. Since mapping 12-bit values onto 12-bit values implies average slopes of about 1 for monotonic functions and 2 for symmetric functions, a maximum of 4 seems very limiting. On the other hand, a slope of 512 would allow the entire 4096 value range of the 12-bit output to be overflowed well within a single interpolation interval, which seems rather excessive. Thus, a 32-bit-wide table is chosen.

Figure 7:
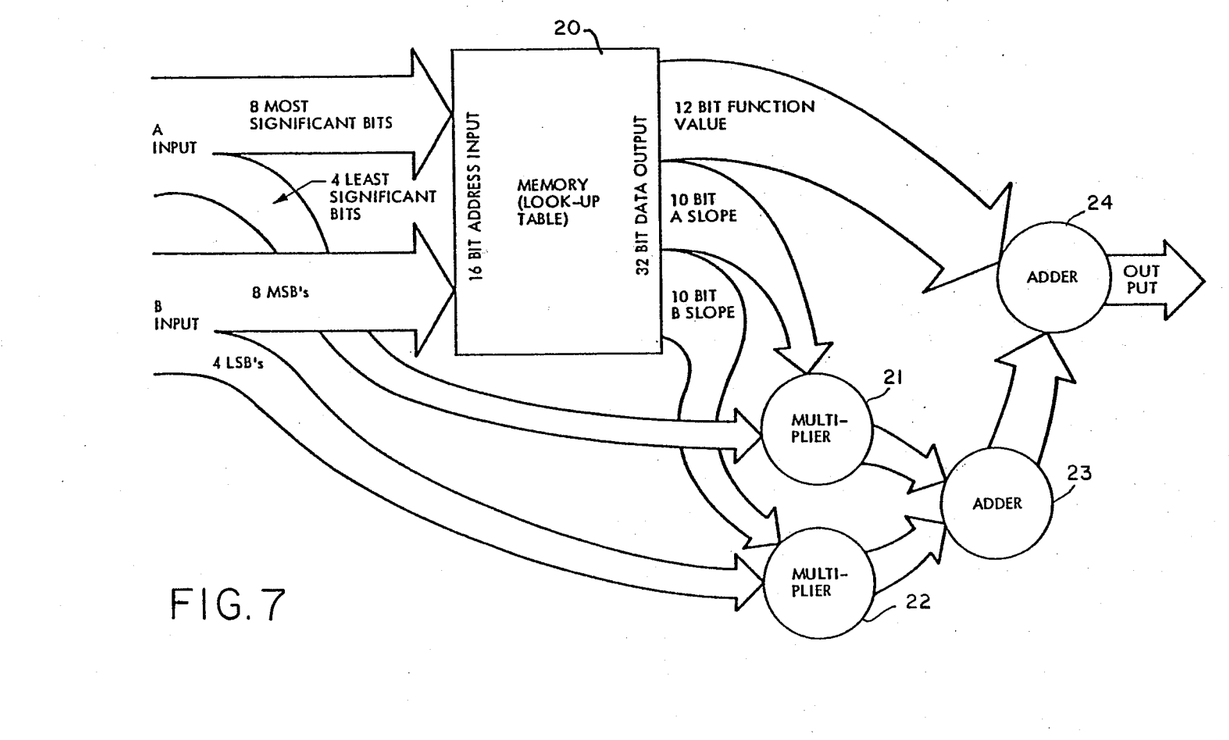
FIG. 7 illustrates the organization of the programmable binary function generator in the modules based on look-up tables with as many as two arguments and linear interpolation of the arguments.

These considerations lead to the unique table-look-up design of FIG. 7. The eight most significant bits of each function argument are used to address a 64K by 32 look-up table 20. Twelve of the output bits represent the function value at each of the 64K values. The remaining twenty bits represent two slopes, each ten-bit signed (two's complement for negative) values, with 4 bits to the right of the binary point. Each of these slopes is multiplied in multipliers 21 and 22 by the four least significant bits of the appropriate function argument, and the two products are added in a binary adder 23. The four least significant bits of the result are discarded, and the remaining portion (ten significant bits plus duplicated sign bit for two's-complement arithmetic) are added in a binary adder 24 to the 12-bit function value looked up in the table to produce the final interpolated output.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. A pipelined video image processor having an input and an output for processing a pixel data stream comprising a two-dimensional array of computing modules, each module having at least one input and one output, disposed in N columns and M rows, and each module having at least a first selector adapted to selectably interconnect at least said one output of a module to said input of at least one module in a succeeding column of the same or different row, thereby enabling the programming of selected computing paths, whereby said data stream may be processed in accordance with a predetermined processing algorithm, said data stream flowing essentially in one selected data path generally through the same or different rows wherein said data stream may undergo serial processing at each column of said computing modules, and further wherein said data stream may undergo branching to other data paths to undergo parallel processing, where another data path may converge with said one data path as required by said processing algorithm, and means for connecting directly said computing modules located in the Nth column to at least one selected module located in the first column, whereby a programmed data path in the algorithm to be executed which requires more than N modules to complete may proceed from one module in the Nth column to an input of a module in the first column and different row such that said programmed data path may pass through said array more than one time, whereby a wide range of processing algorithms requiring different path lengths and branching requirements may be accommodated wherein said modules are each comprised of two convolvers and two selectors for selecting separate inputs to each convolver, a binary function operator responsive to the outputs of said convolvers for generating a function of one or two variables, a neighborhood comparison operator responsive to the output of said binary function operator for producing a module output, and said output selector connected to produce as a second output the output of any one of said components including said input selectors and said neighborhood comparison operator.

2. A pipelined video image processor as defined in claim 1 wherein said binary function operator is comprised of a look-up table for two arguments, which may be used with only one argument by making the stored function change only with change in one of the arguments, thereby omitting the other argument.

3. A pipelined video image processor as defined in claim 2 wherein said table is addressed by the most significant N bits of the output of each convolver, each convolver output having N+K bits, and the output of said table includes in separate groups of bits the function value and the slope of the function for each argument for interpolation.

4. A pipelined video image processor as defined in claim 3 including means for multiplying the K bits of each argument by the slopes of the respective argument, and means for adding the two products to the function value, thereby interpolating the function value of N+K bits obtained by addressing said look-up table by N bits of each argument.

5. A pipelined video image processor as defined in claim 4 wherein said means for adding includes a first adder for adding the two products together and a second adder for adding the sums of said two products to the function value read from the look-up table.

* * * * *